US009720808B2

(12) United States Patent
Jones et al.

(10) Patent No.: US 9,720,808 B2
(45) Date of Patent: Aug. 1, 2017

(54) OFFLINE DEBUGGING USING A REPLICATED OPERATING ENVIRONMENT

(75) Inventors: Peter M. Jones, Cambridge, MA (US); Christopher E. Lumens, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 217 days.

(21) Appl. No.: 13/306,338

(22) Filed: Nov. 29, 2011

(65) Prior Publication Data

US 2013/0139128 A1     May 30, 2013

(51) Int. Cl.
*G06F 9/44* (2006.01)
*G06F 11/36* (2006.01)

(52) U.S. Cl.
CPC ........ *G06F 11/3664* (2013.01); *G06F 11/366* (2013.01)

(58) Field of Classification Search
CPC ........................... G06F 11/3664; G06F 11/366
USPC .......................................................... 717/128
See application file for complete search history.

(56) References Cited

U.S. PATENT DOCUMENTS

| 7,383,547 | B1* | 6/2008 | Miri .................... G06F 11/261 718/100 |
| 7,536,291 | B1* | 5/2009 | Vijayan Retnamma ........... G06F 3/0619 703/21 |
| 7,673,182 | B2* | 3/2010 | Gooding et al. ................ 714/39 |
| 7,930,165 | B2* | 4/2011 | Weiss .................... G06F 11/261 717/130 |
| 8,136,096 | B1* | 3/2012 | Lindahl et al. ............... 717/129 |
| 8,209,680 | B1* | 6/2012 | Le et al. ....................... 717/174 |
| 2004/0194097 | A1* | 9/2004 | Spencer .................. G06F 9/546 718/100 |
| 2007/0050686 | A1* | 3/2007 | Keeton ................. G06F 11/261 714/48 |
| 2008/0189468 | A1* | 8/2008 | Schmidt ............... G06F 11/203 711/6 |
| 2008/0209414 | A1* | 8/2008 | Stein ............................. 717/173 |
| 2009/0070639 | A1* | 3/2009 | Langford et al. .............. 714/57 |
| 2009/0190674 | A1* | 7/2009 | Bates .................. H04L 12/2697 375/257 |
| 2009/0281783 | A1* | 11/2009 | Bitar ................... G06F 11/3457 703/21 |
| 2010/0017184 | A1* | 1/2010 | Vijayan Retnamma ........... G06F 3/0619 718/1 |
| 2011/0296385 | A1* | 12/2011 | Wielaard ...................... 717/124 |
| 2012/0233123 | A1* | 9/2012 | Shisheng et al. ............. 707/639 |
| 2013/0339784 | A1* | 12/2013 | Bickelman ......... G06F 11/1092 714/6.11 |

OTHER PUBLICATIONS

Buyya et al., "Modeling and Simulation of Scalable Cloud Computing Environments and the CloudSim Toolkit: Challenges and Opportunities", 2009, IEEE.*

(Continued)

*Primary Examiner* — Wei Zhen
*Assistant Examiner* — Junchun Wu
(74) *Attorney, Agent, or Firm* — Lowenstein Sandler LLP

(57) ABSTRACT

A debugging system receives traceback data representing logging of a system error of a target system. An operating environment of the target system is replicated by creating a virtual machine (VM) having characteristics represented by the state data representing an operating state of the target system. An analysis is performed on the traceback data within the VM to simulate the system error.

16 Claims, 4 Drawing Sheets

(56) References Cited

OTHER PUBLICATIONS

Morelos-Zaragoza, "On the Error Performance of Coding and Equalization in Low-Complexity Ultra-Wideband Communication Systems", 2006, IEEE.*

Xin et al., "Reliability Mechanisms for Very Large Storage Systems", 2003, IEEE.*

Lunetta et al. "Remote sensing and geographic information system data integration", Jun. 1991, Photogrammetric Engineering & Remote Sensing, vol. 57, No. 6, pp. 677-687.*

* cited by examiner

OFFLINE DEBUGGING USING A REPLICATED OPERATING ENVIRONMENT

TECHNICAL FIELD

Embodiments of the present invention relate generally to software debugging. More particularly, embodiments of the invention relate to offline debugging in a replicated operating environment.

BACKGROUND

Computers typically execute programs in one or more processes or threads on one or more processors. In developing computer programs, programmers often use "debugging" tools to enable them to verify correct operation of the programs. Debugging is a methodical process of finding and reducing the number of bugs, or defects, in a computer program or a piece of electronic hardware, thus making it behave as expected. Debugging tends to be harder when various subsystems are tightly coupled, as changes in one may cause bugs to emerge in another. Using debugging tools, programmers can step through a program and determine whether the results that the program generates at various points are as would be expected.

Debugging ranges, in complexity, from fixing simple errors to performing lengthy and tiresome tasks of data collection, analysis, and scheduling updates. The debugging skill of the programmer can be a major factor in the ability to debug a problem, but the difficulty of software debugging varies greatly with the complexity of the system, and also depends, to some extent, on the programming language(s) used and the available tools, such as debuggers. Debuggers are software tools which enable the programmer to monitor the execution of a program, stop it, re-start it, set breakpoints, and change values in memory. The term "debugger" can also refer to the person who is doing the debugging.

Remote debugging has been widely used in recent years. Remote debugging is the process of debugging a program running on a system different than the debugger. To start remote debugging, the debugger connects to a remote system over a network. Once connected, the debugger can control the execution of the program on the remote system and retrieve information about its state.

In some situations, when a system error occurs on a target machine, traceback data representing logging of the execution of instructions that cause the system error may be transmitted to a remote system for offline analysis. Often, a bug report received at the remote system is incomplete with respect to the system or storage setup of the remote system. As a result, the bug cannot be replicated at the remote system.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, data concerning operating states of a computer system (e.g., target system) is collected, where the data can be used subsequently to create a replicated or simulated operating environment for debugging purpose. The data, referred to herein as state data, can be collected periodically or alternatively, it can be collected when a component of the system is changed or upgraded (e.g., installation of a software component such as an operating system or hardware device) that may change the characteristics of the operating environment of the system. In one embodiment, the state data represents the configuration and details of hardware environment.

Subsequently, when an error occurs within the target system, the state data can be used to replicate or simulate an operating environment of the target system at another system. The traceback data of the error can then be analyzed in a replicated operating environment of the target system hosted in another system, referred to herein as a debugging system. As a result, since the debugging is performed in a simulated operating environment of the target system, the error can be consistently replicated based on the traceback data. In one embodiment, the state of the target system is replicated based on the state data, generating the files on a new system (e.g., virtual system), without all the underlying original files of the target system, which may require significantly fewer resources (e.g., storage space or memory) for analyzing the traceback data.

Figure 1:
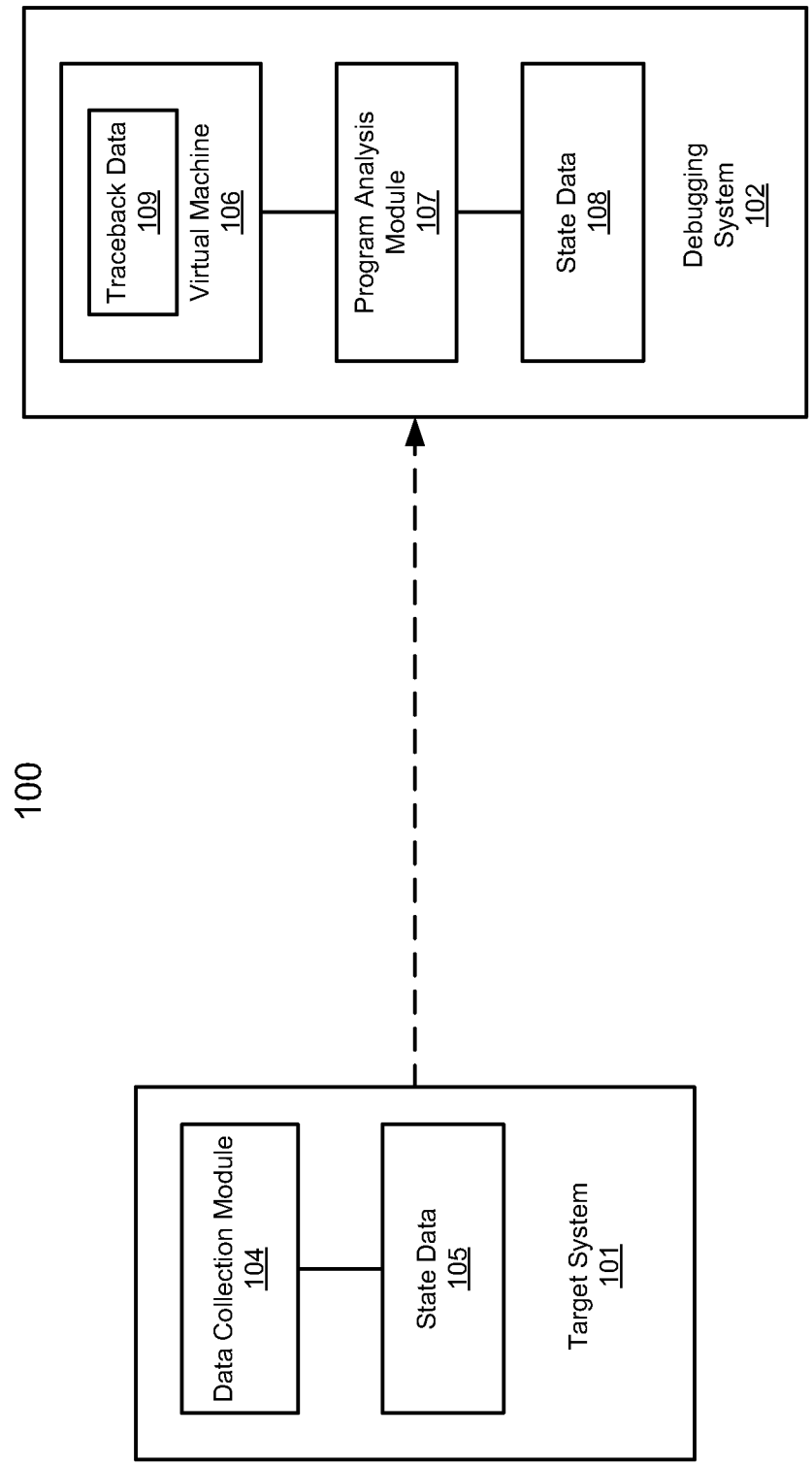
FIG. 1 is a block diagram illustrating a system configuration for remote debugging according to one embodiment of the invention.

FIG. 1 is a block diagram illustrating a system configuration for remote debugging according to one embodiment of the invention. Referring to FIG. 1, system 100 includes target system 101 and debugging system 102. Systems 101-102 can be a variety of computing devices, such as a server, a desktop, a laptop, a mobile device, etc. In one embodiment, any of systems 101-102 may be a part of a Red Hat Enterprise Linux (RHEL) system available from Red Hat®, Inc. of Raleigh, N.C.

In one embodiment, target system 101 includes data collection module 104 to collect state data 105 that represents an operating state of system 101. Data collection module 104 may be implemented as a component of an operating system (not shown) running within system 101. Alternatively, data collection module 104 may be implemented as part of an installer that installs components of the operating system of target system 101. State data 105 can be collected prior to, during, and/or after an installation of a software component, particularly, when the installation may change characteristics of the operating environment of target system 101.

In one embodiment, state data 105 can then be transmitted to debugging system 102 and stored there as part of state data 108, which may be used subsequently to replicate or simulate an operating environment of target system 101. For example, state data 105 can be transmitted to system 102 using a portable storage device such as a universal serial bus (USB) drive or alternatively, it can be transmitted over a network. In one embodiment, state data 108 is used to create virtual machine (VM) 106 that has operating characteristics similar to those of target system 101. When an error occurs in target system 101, traceback data that is collected during operations of the target system 101 (e.g., prior to, during the occurrence of the error, and/or thereafter) is transmitted to system 102 and stored as part of traceback data 109. In addition, state data 105 from target system 101 is also transmitted to debugging system 102 and stored as part of state data 108. In one embodiment, state data 105 represents the configuration and details of hardware environment. During debugging, VM 106 is created based on state data 108, where VM 106 replicates or simulates the operating environment of target system 101. Traceback data 109 is then analyzed within VM 106 by program analysis module 107. As a result, since a consistent operating environment of target system 101 is replicated within debugging system 102 in the form of VM 106, the error that occurred in target system 101 can be more likely duplicated based on traceback data 109 in VM 106 of debugging system 102. This may reduce the probability of situations in which an error cannot be replicated or a different error occurs on a debugging system due to the operating environment of the debugging system being different from the operating environment of a target system.

It is useful to note that the state data is collected before any work is done which could create the error. It is not just that it is more likely that the error can be replicated on a virtual machine than on physical hardware. Rather, it is a combination of a) likely not having any access to the original machine whatsoever, and b) the possibility (and even likelihood) of the failure being debugged to be destructive to the test case. With embodiments of the invention, the problem setup can be replicated after the target system has effectively been destroyed. The idea is to be able to replicate the failed system in the simulated environment, and thus to begin debugging before the failure occurs. The embodiments of the invention allow a user to do more thorough debugging by both a) examining the state of the system before the error occurs, and b) giving the user more data than just the traceback, i.e. giving us a live system, when the failure does happen.

Traceback data represents a sequence of events that occurred during an execution of a program, which may be a stream of recorded events (e.g., trace). An example of an event could be re-used disks from a previous installation with dramatically different configuration. More specifically, in the past we've experienced problems when one disk of a RAID storage array was re-used on a different machine without other disks from that array. Attempting to start such an array often resulted in failures that are incorrectly handled. In this case the traceback may be the same as with other bugs in starting RAID devices, but the replication of the data in the simulated environment is critical in distinguishing between this error and other bugs.

Embodiments of the invention can be applied to the storage hardware of a system. That seems to be where the majority of the unusual bugs exist. The reason for this is that storage setups are drastically different across computers. When doing an installation, developers first have to examine the state of storage before they can make recommendations on how to do the installation. They then later allow a user to create whatever partitions and file systems they want, and then perform the actions required to put the system into that configuration. The bugs arise due to two main categories: (1) the storage-specific hardware attached to the system; and (2) the pre-existing state of the system. In the first case, different hardware has different quirks, as well as being supported by different OS drivers and different software libraries that the installer depends upon. All of these can of course have their own bugs that developers have to work around. In the second case, an installer has to recognize and handle a variety of conditions. There is the partitions and file systems created by other operating systems (other versions of RHEL, other distributions of Linux, and completely different OSes); metadata for various versions of storage technologies (LVM, RAID, etc.); plus corrupt, incomplete, or incorrect versions of all of the above. In short, there is a lot of places where something can go wrong. There are too many components and failure paths to be able to test everything. If developers can collect data from crashed systems and exactly or substantially replicate the pre-existing state of their storage systems plus the actions they requested the installer take, the developers can accomplish two very useful goals: (1) they can replay the actions against the VM to debug and fix the problem; (2) they can continue storing this information to use in regression testing, making sure future releases do not cause the problem to come back up.

Referring back to FIG. 1, traceback data may be used to determine the behavior of the program. A software developer typically utilizes traceback data to analyze performance of a program or to debug the program. Traceback data may be generated by a monitoring module running within an operating system to trace any event generated by a program. The traceback data may be different for the same program executed in different operating environments (e.g., different disk space or system memory). In order to duplicate an error based on the traceback data on a consistent basis, it is important to replicate the error in an operating environment that is the same or similar to the operating environment in which the traceback data was generated. By capturing state data representing an operating state of the target system and replicating an operating environment of the target system using the state data, according to one embodiment, an error can be consistently replicated based on the traceback data.

Virtual machine 106 can be any type of virtual machine, such as, for example, hardware emulation, full virtualization, para-virtualization, and operating system-level virtualization virtual machines. Program debugging tools such as program analysis module 107 may be executed and hosted by an operating system within virtual machine 106. Such an operating system in virtual machine 106 is also referred to as a guest operating system. Multiple guest operating systems and the associated virtual machines may be controlled by another operating system (also referred to as a host OS, not shown). Typically, a host OS represents a virtual machine monitor (VMM) (also referred to as a hypervisor) for managing the hosted virtual machines. A guest OS may be of the same or different type with respect to the host OS. For example, a guest OS may be a Windows™ operating system from Microsoft and a host OS may be a Linux operating system available from Red Hat.

In one embodiment, state data 105 includes detailed information regarding a storage device, such as, for example, vendor, model, serial number, firmware version, size, sector size, and sector alignment, etc. State data 105 further includes information concerning the basic format of the storage device such as metadata, partition tables, etc. Additional useful data would include the amount of RAM installed in the system, the number of CPUs, and their exact instruction set architecture, i.e., is this a CPU with hyper-threading, SSE, etc., and storage controllers (PCI/IPCIe devices) connected. In terms of storage, other useful data would include RAID metadata, connection topology (i.e., this storage device is connected to this storage controller), multipath topology, and logical volume metadata. State data 105 further includes information concerning a file system of system 101, such as type of the file system, size, unique universal identifier (UUID), labels, etc. In a particular embodiment, state data 105 further includes a list of all the types of storage devices connected including manufacturer, model, capacity, and protocol; the partition tables and metadata blocks from all storage devices; the manufacturer and model of processor; the amount of memory; a list of all other attached pieces of hardware including type, manufacturer, and model; a list of any other installed operating systems; and the version of our product being installed including architecture (which could be different from that of the processor), build stamp information, and version of the installer. This information may be collected and stored in a persistent storage location when target system 101 is initially configured or when the configuration of system 100 changes. This information is then submitted together with traceback data to debugging system 102 for debugging.

When it is time to analyze traceback data 109, one or more emulated storage devices are created based on state data 105, where the emulated storage devices have the same or similar characteristics of those present on target system 101. In one embodiment, a QEMU compatible emulated disk is created based on state data 105. Creating a replicated environment will also involve constructing whatever file QEMU requires to describe a machine, plus performing some manipulations on the disk images being provided to QEMU before debugging can begin. These manipulations would involve operations such as creating filesystems, writing out metadata to exact locations, and the like. Debugging system 102 boots into a virtualized environment (e.g., VM 106) having the QEMU compatible emulated disk which has a disk layout which appears to the operating system to be the same as or similar to the disk layout of target system 101. Thereafter, traceback data 109 can be analyzed within the virtualized environment.

According to one embodiment, for each disk in the failed system, an emulated disk such as a QEMU emulated sparse disk (e.g., qcow2) allows for underlying host disk sectors to remain unallocated until such time as they are used by the guest system. If a user does not plan on ever filling the emulated disk image to its full capacity, it can reside on a physical disk significantly smaller than the disk it represents. The partitions and other metadata are then replicated in the emulated disk. The emulated disk is added to the configuration for the virtualization environment in an appropriate way as to mimic the failed system's topology. Once all disk images are created, appropriate higher-level constructs such as logical volumes and partitions as seen on the failed system are created.

QEMU is a processor emulator that relies on dynamic binary translation to achieve a reasonable speed while being easy to port to new host central processing unit (CPU) architectures. In conjunction with CPU emulation, it also provides a set of device models, allowing it to run a variety of unmodified guest operating systems; it can thus be viewed as a hosted virtual machine monitor. It also provides an accelerated mode for supporting a mixture of binary translation (for kernel code) and native execution (for user code).

Figure 2:
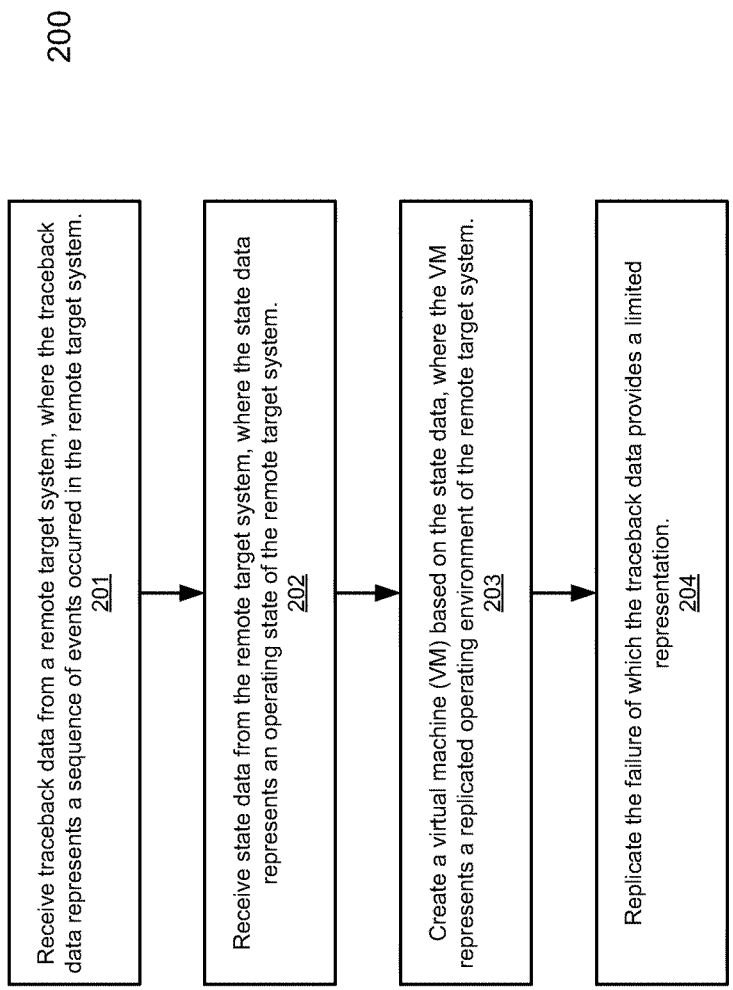
FIG. 2 is a flow diagram illustrating a method for remote debugging according to one embodiment of the invention.

FIG. 2 is a flow diagram illustrating a method for remote debugging according to one embodiment of the invention. Method 200 may be performed by debugging system 102 of FIG. 1. Referring to FIG. 2, at block 201, traceback data is received from a remote system, where the traceback data represents a sequence of events that occurred and that were logged by the remote system. At block 202, state data is received from the remote target system, where the state data represents an operating state of the remote target system. The state data may include certain detailed configuration information about at least a storage device and/or file system of the remote system as described above. At block 203, a virtual operating environment such as a virtual machine is created based on the state data, where the virtual operating environment replicates or simulates an operating environment of the remote system. Such a virtual operating environment is created based on the state data without requiring the entirety of any filesystems. There may not be any files from the remote system to require. The developers may be doing an install on a completely blank system. This could occur if it is something straight from a factory, or if blank disks are being installed. Note that operations involved in blocks 202 and 203 may be performed in significantly different periods of time. Also note that the traceback and state data can be stored anonymously in a database so that developers can go back and recreate the environment repeatedly and at any time of their choices, which may be performed automatically. At block 204, the system boots into the virtual operating environment and the the failure is replicated of which the traceback data provides a (limited) representation. In this embodiment, a debugger could be attached to the failing program in order to trace execution and examine the system at greater detail than the traceback provides, before and after the failure happens.

Figure 3:
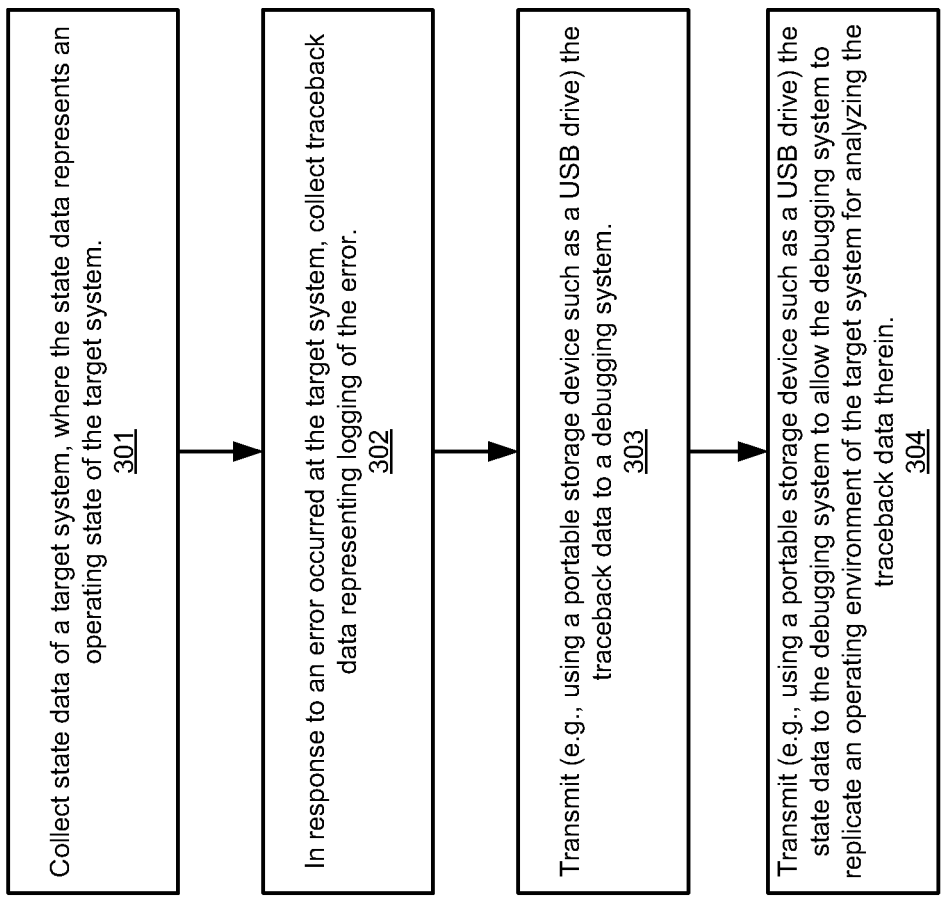
FIG. 3 is a flow diagram illustrating a method for remote debugging according to another embodiment of the invention.

FIG. 3 is a flow diagram illustrating a method for remote debugging according to another embodiment of the invention. Method 300 may be performed by target system 101 of FIG. 1. Referring to FIG. 3, at block 301, state data of a target system is collected, where the state data represents an operating state of the target system. The state data may include certain detailed configuration information about a storage device and/or file system of the target system as described above. In response to the occurrence of an error at the target system, at block 302, traceback data is collected, which represents a trace of one or more events that occurred in the target system over a period of time including prior to, during, and after which the error occurred. At block 303, the traceback data is transmitted to a debugging system. At block 304, the state data is transmitted to the debugging system to allow the debugging system to replicate an operating environment of the target system for analyzing the traceback data therein. The traceback data and/or state data can be transmitted using a portable USB storage device.

Figure 4:
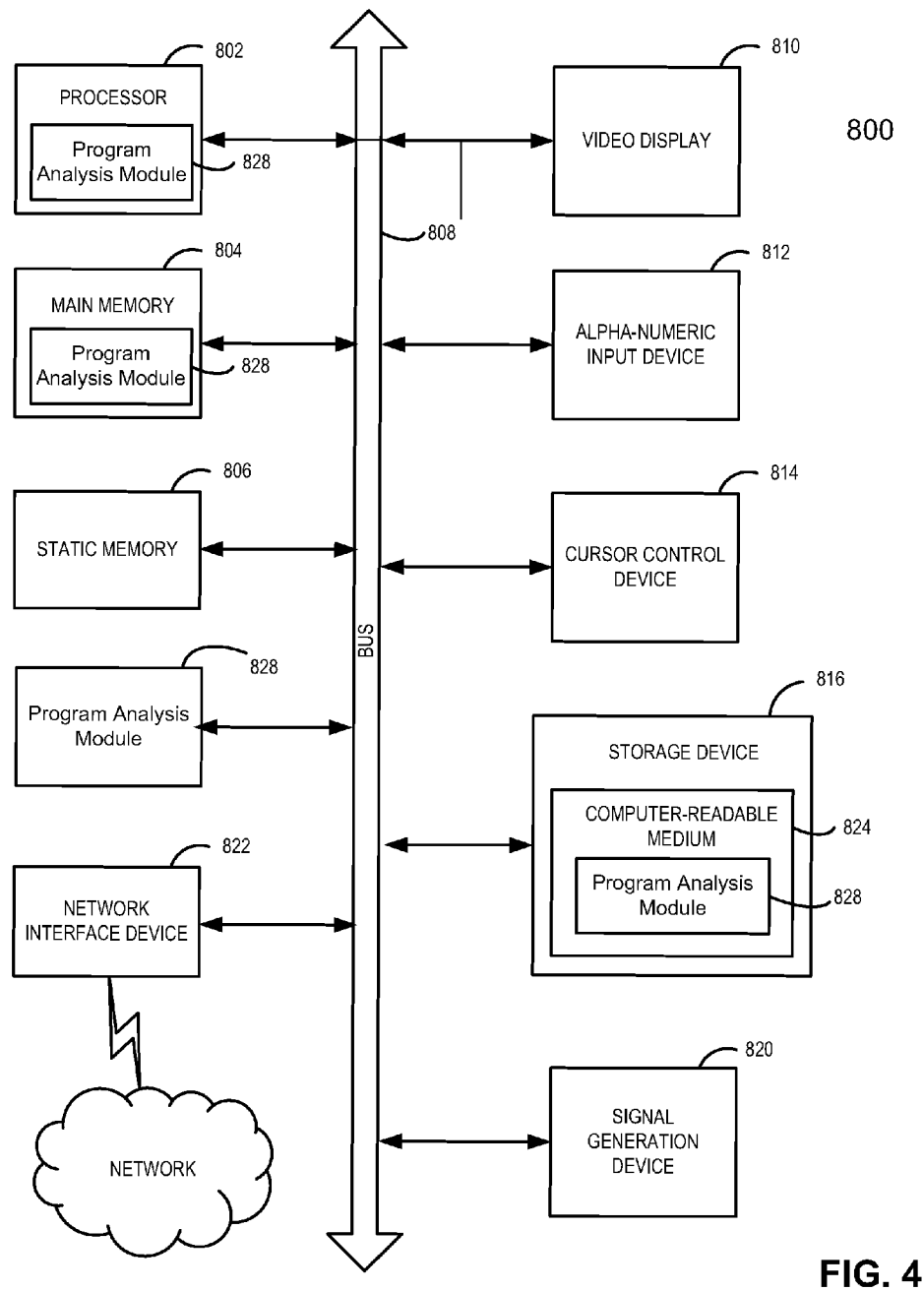
FIG. 4 illustrates a data processing system which may be used with an embodiment of the invention.

FIG. 4 illustrates a data processing system which may be used with an embodiment of the invention. For example, system 800 may represent any of systems 101-102 of FIG. 1. Referring to FIG. 4, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a non-transitory computer-readable storage medium 824 (also known as a non-transitory machine-readable storage medium or a non-transitory computer-accessible medium) on which is stored one or more sets of instructions or software (e.g., module 828) embodying any one or more of the methodologies or functions described herein. The module 828 may also reside, completely or at least partially, within the main memory 804 and/or within the processor 802 during execution thereof by the computer system 800, the main memory 804 and the processor 802 also constituting non-transitory computer-readable storage media. The module 828 may further be transmitted or received over a network via the network interface device 822.

The non-transitory computer-readable storage medium 824 may also be used to store program analysis module 107 and/or data collection module 104 persistently. While the non-transitory computer-readable storage medium 824 is shown in an exemplary embodiment to be a single medium, the term "non-transitory computer-readable storage medium" should be taken to include a single medium or multiple media (e.g., a centralized or distributed database, and/or associated caches and servers) that store the one or more sets of instructions. The terms "non-transitory computer-readable storage medium" shall also be taken to include any medium that is capable of storing or encoding a set of instructions for execution by the machine and that cause the machine to perform any one or more of the methodologies of the present invention. The term "non-transitory computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer-readable medium. A non-transitory computer-readable medium includes any mechanism for storing information in a form readable by a machine (e.g., a computer). For example, a non-transitory computer-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    receiving, over a network from a target system, traceback data representing logging of a system error of the target system;
    in response to receiving the traceback data over the network from the target system, replicating an operating environment of the target system by creating a virtual machine (VM) having characteristics represented by state data representing a hardware operating state of the target system in response to the system error of the target system occurring;
    emulating a storage device in view of the state data representing the hardware operating state of the target system in response to the system error of the target system occurring; and
    performing, by a processing device, an analysis on the traceback data representing logging of the system error of the target system, within the VM replicating the operating environment of the target system and in view of the emulated storage device, to simulate and to correct the system error of the target system by executing an operation associated with the traceback data within the VM.

2. The method of claim 1, further comprising:
    creating an emulated disk having a similar disk layout of the storage device of the target system; and
    booting into the VM having the emulated disk prior to the analysis of the traceback data.

3. The method of claim 1, wherein the state data comprises information concerning a size, sector size, and sector alignment of the storage device of the target system and information concerning a type, size, unique universal identifier, and label of the file system of the target system.

4. The method of claim 1, wherein the VM comprises a guest operating system (OS) which is hosted by a host OS of a debugging system.

5. The method of claim 1, further comprising receiving the state data from the target system.

6. A non-transitory computer-readable storage medium comprising instructions stored therein, which when executed by a processing device, cause the processing device to:
    receive, over a network from a target system, traceback data representing logging of a system error of the target system;
    in response to receiving the traceback data over the network from the target system, replicate an operating environment of the target system by creating a virtual machine (VM) having characteristics represented by state data representing a hardware operating state of the target system in response to the system error of the target system occurring;
    emulate a storage device in view of the state data representing the hardware operating state of the target system in response to the system error of the target system occurring; and
    perform, by the processing device, an analysis on the traceback data representing logging of the system error of the target system, within the VM replicating the operating environment of target system and in view of the emulated storage device, to simulate and to correct the system error of the target system by executing an operation associated with the traceback data within the VM.

7. The non-transitory machine-readable storage medium of claim 6, wherein the processing device is further to:
    create an emulated disk having a similar disk layout of the storage device of the target system; and
    boot into the VM having the emulated disk prior to the analysis of the traceback data.

8. The non-transitory machine-readable storage medium of claim 6, wherein the state data comprises information concerning a size, sector size, and sector alignment of the storage device of the target system and information concerning a type, size, unique universal identifier, and label of the file system of the target system.

9. The non-transitory machine-readable storage medium of claim 6, wherein the VM comprises a guest operating system (OS) which is hosted by a host OS of a debugging system.

10. The non-transitory machine-readable storage medium of claim 6, wherein the processing device is further to receive the state data from the target system.

11. A system, comprising:
    a processing device; and
    a memory operatively, operatively coupled with the processing device, wherein the processing device is to:
    receive, over a network from a target system, traceback data representing logging of a system error of the target system,
    in response to receiving the traceback data over the network from the target system, replicate an operating environment of the target system by creating a virtual machine (VM) having characteristics represented by state data representing a hardware operating state of the target system in response to the system error of the target system occurring,
    emulate a storage device in view of the state data representing the hardware operating state of the target system in response to the system error of the target system occurring, and
    perform an analysis on the traceback data representing logging of the system error of the target system, within the VM replicating the operating environment of the target system and in view of the emulated storage device, to simulate and to correct the system error of the target system by executing an operation associated with the traceback data within the VM.

12. The system of claim 11, wherein an emulated disk is created having a similar disk layout of the storage device of the target system, and the system boots into the VM having the emulated disk prior to the analysis of the traceback data.

13. The system of claim 11, wherein the state data comprises information concerning a size, sector size, and sector alignment of the storage device of the target system and information concerning a type, size, unique universal identifier, and label of the file system of the target system.

14. The system of claim 11, wherein the VM comprises a guest operating system (OS) which is hosted by a host OS of a data processing system.

15. A method comprising:
collecting state data representing an operating state of a data processing system in response to a system error of the data processing system occurring;
in response to the occurrence of the system error within the data processing system, transmitting traceback data representing logging of the system error of the data processing system over a network to a debugging system; and
transmitting, by a processing device, the state data over the network to the debugging system to allow the debugging system to emulate a storage device in view of the state data representing the hardware operating state of the target system in response to the system error of the target system occurring and create a virtual machine (VM) in view of the state data and the emulated storage device, the VM replicating a hardware operating environment of the data processing system in response to the system error of the data processing system occurring, wherein the traceback data representing logging of the system error of the target system is to be analyzed within the VM executed in the debugging system, such that the system error of the data processing system can be duplicated in an operating environment similar to the operating system of the data processing system by executing an operation associated with the traceback data within the VM.

16. The method of claim 15, wherein the state data comprises information concerning a size, sector size, and sector alignment of the storage device of the data processing system and information concerning a type, size, unique universal identifier, and a label of the file system of the data processing system.

* * * * *